United States Patent
Lee et al.

(10) Patent No.: US 11,555,112 B2
(45) Date of Patent: Jan. 17, 2023

(54) COMPOSITION FOR RACK HOUSING MEMBER OF VEHICLE HAVING EXCELLENT DIMENSIONAL STABILITY AND RACK HOUSING MEMBER OF VEHICLE PREPARED USING THE SAME

(71) Applicants: HYUNDAI MOBIS CO., LTD., Seoul (KR); HYUNDAI ADVANCED MATERIALS CO., LTD., Hwaseong-si (KR)

(72) Inventors: Jin Won Lee, Yongin-si (KR); Jeong Jae Park, Yongin-si (KR); Yeong Ah Cheon, Yongin-si (KR); Sang Ho Bang, Cheonan-si (KR); Seung Soo Hong, Osan-si (KR); Dong Chang Lee, Cheonan-si (KR)

(73) Assignees: Hyundai Mobis Co., Ltd., Seoul (KR); HYUNDAI ADVANCED MATERIALS CO., LTD., Hwaseong-si (KR)

( * ) Notice: Subject to any disclaimer, the term of this patent is extended or adjusted under 35 U.S.C. 154(b) by 81 days.

(21) Appl. No.: 17/112,079

(22) Filed: Dec. 4, 2020

(65) Prior Publication Data
US 2021/0171763 A1 Jun. 10, 2021

(30) Foreign Application Priority Data
Dec. 4, 2019 (KR) .......................... 10-2019-0159692

(51) Int. Cl.
| | | |
|---|---|---|
| C08L 67/02 | (2006.01) | |
| C08K 7/14 | (2006.01) | |
| C08K 3/34 | (2006.01) | |
| C08L 51/04 | (2006.01) | |
| B62D 5/04 | (2006.01) | |
| B62D 6/10 | (2006.01) | |

(52) U.S. Cl.
CPC ............ *C08L 67/02* (2013.01); *B62D 5/0403* (2013.01); *B62D 5/0424* (2013.01); *B62D 6/10* (2013.01); *C08K 3/34* (2013.01); *C08K 7/14* (2013.01); *B60Y 2400/307* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 4,283,326 A * | 8/1981 | Charles | ..................... | C08K 3/34 525/65 |
| 4,404,161 A * | 9/1983 | Bier | ........................ | C08L 67/02 264/328.18 |
| 4,560,715 A * | 12/1985 | Ueeda | ...................... | C08K 3/34 523/513 |
| 6,689,838 B1 * | 2/2004 | Fischer | ................... | C08L 67/02 525/88 |
| 8,546,469 B2 | 10/2013 | Lee et al. | | |
| 2008/0076859 A1* | 3/2008 | Eipper | ..................... | C08L 67/02 524/427 |
| 2011/0144238 A1* | 6/2011 | Nelson | ..................... | C08L 53/00 524/505 |

FOREIGN PATENT DOCUMENTS

CN 102093677 A 6/2011

OTHER PUBLICATIONS

Office Action dated Aug. 3, 2022 from the Chinese Patent Office for Chinese Patent Application No. 202011398270.4.
"Study on the preparation and performance of low-warpage glass-fibre reinforced PET composite material", Liao Jiazhi et al., China Plastics, vol. 16, No. 7, pp. 37-39 (Aug. 31, 2002).

* cited by examiner

*Primary Examiner* — David J Buttner
(74) *Attorney, Agent, or Firm* — H.C. Park & Associates, PLC

(57) ABSTRACT

The present disclosure relates to a composition for a rack housing member of a vehicle having excellent dimensional stability, and a rack housing member of a vehicle formed therefrom. In an embodiment, the composition for a rack housing member of a vehicle comprises 100 parts by weight of a base resin containing polybutylene terephthalate, an acrylonitrile-styrene-acrylate copolymer, and polyethylene terephthalate, and 40 to 75 parts by weight of an inorganic filler, wherein the inorganic filler includes a glass fiber and a plate-shaped mineral filler.

14 Claims, 1 Drawing Sheet

COMPOSITION FOR RACK HOUSING MEMBER OF VEHICLE HAVING EXCELLENT DIMENSIONAL STABILITY AND RACK HOUSING MEMBER OF VEHICLE PREPARED USING THE SAME

CROSS-REFERENCE TO RELATED APPLICATION

This application claims priority from and the benefit of Korean Patent Application No. 10-2019-0159692, filed on Dec. 4, 2019, which is hereby incorporated by reference for all purposes as if set forth herein.

BACKGROUND

Field

Exemplary embodiments relate to a composition for a rack housing member of a vehicle having excellent dimensional stability, and a rack housing member of a vehicle formed therefrom.

Discussion of the Background

A power steering of a vehicle is a motor-driven power steering device powered by hydraulic pressure of a hydraulic pump, driven by an engine, so as to allow the vehicle to turn with small steering wheel power. The power steering assists the driver's steering by transferring an output of an electric motor, as an auxiliary torque that assists a steering torque, to a steering shaft through a reduction gear mechanism when the steering torque is input to a steering shaft through a steering wheel. For example, when the driver operates the steering wheel, the torque applied to the steering shaft is output to a detection sensor such as a rack housing torque sensor, and is controlled by a control device.

A cover of such a torque sensor was manufactured using a thermoplastic resin such as a polyester-based resin, and a glass fiber. Meanwhile, the polyester-based resin is an engineering plastic having excellent mechanical and electrical properties and physical and chemical properties, and is applied to a wide range of fields such as a vehicle, electric and electronic devices, and an office machine. The thermoplastic resin such as the polyester-based resin, however, is disadvantageous in terms of dimensional stability due to its severe thermal expansion and contraction compared to metal. Thus, airtightness deteriorates due to post-deformation in a component connection portion, etc., which is caused by heat under a high-temperature environment, causing a leak in an assembled component.

Prior art documents related to the present disclosure include Korean Patent Application Laid-Open No. 2014-0092471 (published on Jul. 24, 2014, entitled "Polyester Composition").

The above information disclosed in this Background section is only for enhancement of understanding of the background of the invention and, therefore, it may contain information that does not constitute prior art.

SUMMARY

Exemplary embodiments of the present invention provide a composition for a rack housing member of a vehicle having excellent dimensional stability and an excellent effect of improving warping during injection molding.

Additional features of the invention will be set forth in the description which follows, and in part will be apparent from the description, or may be learned by practice of the invention.

Another object of the present disclosure is to provide a composition for a rack housing member of a vehicle having excellent rigidity, durability, and chemical resistance.

Still another object of the present disclosure is to provide a composition for a rack housing member of a vehicle having excellent injection moldability, productivity, and economic efficiency.

Yet another object of the present disclosure is to provide a method of preparing the composition for a rack housing member of a vehicle.

Still yet another object of the present disclosure is to provide a rack housing member of a vehicle manufactured using the composition for a rack housing member of a vehicle.

One aspect of the present disclosure relates to a composition for a rack housing member of a vehicle. In an embodiment, a composition for a rack housing member of a vehicle comprises: 100 parts by weight of a base resin containing polybutylene terephthalate, an acrylonitrile-styrene-acrylate copolymer, and polyethylene terephthalate; and 40 to 75 parts by weight of an inorganic filler, wherein the inorganic filler contains a glass fiber and a plate-shaped mineral filler.

In an embodiment, the base resin may contain 55 to 65 parts by weight of polybutylene terephthalate, 25 to 35 parts by weight of an acrylonitrile-styrene-acrylate copolymer, and 8 to 15 parts by weight of polyethylene terephthalate.

In an embodiment, the polybutylene terephthalate may have an intrinsic viscosity of 0.5 to 1.4 dl/g and the polyethylene terephthalate may have an intrinsic viscosity of 0.5 to 1.2 dl/g.

In an embodiment, the acrylonitrile-styrene-acrylate copolymer may include 20 to 60 parts by weight of acrylate rubber.

In an embodiment, the glass fiber may be included in an amount of 35 to 50 parts by weight and the plate-shaped mineral filler may be included in an amount of 5 to 20 parts by weight, based on 100 parts by weight of the base resin.

In an embodiment, the inorganic filler may include the plate-shaped mineral filler and the glass fiber at a weight ratio of 1:1.2 to 1:4.

In an embodiment, the glass fiber may have a nominal diameter of 3 to 15 μm and an average length of 0.05 to 5 mm.

In an embodiment, the plate-shaped mineral filler may include one or more of wollastonite, talc, and mica.

In an embodiment, the plate-shaped mineral filler may have a cross-sectional aspect ratio (long diameter of cross section/short diameter of cross section) of 3 to 50 and a length of 0.01 to 5 mm.

In an embodiment, the composition for a rack housing member of a vehicle may have a tensile strength of 1,100 to 1,600 kgf/cm$^2$ as measured according to ASTM D 638 standard and a flexural strength of 1,800 to 2,500 kgf/cm$^2$ as measured according to ASTM D 790 standard.

In an embodiment, the composition for a rack housing member of a vehicle may have, after injection-molding, a machine direction (MD) shrinkage in Equation 1 below which is 0.6% or less, and a transverse direction (TD) shrinkage in Equation 2 below which is 1.2% or less:

$$\text{MD shrinkage } (\%) = ((A_1 - A_0)/A_0) \times 100 \quad \text{[Equation 1]}$$

wherein for a specimen obtained by injection-molding the composition for a rack housing member of a vehicle into a mold having 60 mm MD×60 mm TD×2 mm thickness, $A_0$ is an MD length (mm) measured immediately after injection-molding the specimen, and $A_1$ is an MD length (mm) measured after leaving the specimen at 25° C. for 24 hours.

$$\text{TD shrinkage (\%)} = ((B_1 - B_0)/B_0) \times 100 \qquad \text{[Equation 2]}$$

wherein for a specimen obtained by injection-molding the composition for a rack housing member of a vehicle into a mold having 60 mm MD×60 mm TD×2 mm thickness, $B_0$ is a TD length (mm) measured immediately after injection-molding the specimen, and $B_1$ is a TD length (mm) measured after leaving the specimen at 25° C. for 24 hours.

In an embodiment, the TD shrinkage and MD shrinkage may have a relationship of Equation 3 below:

$$|\text{TD shrinkage (\%)} - \text{MD shrinkage (\%)}| \leq 0.6 \qquad \text{[Equation 3]}$$

In an embodiment, a warpage value, measured for a specimen obtained by injection-molding the composition of a rack housing member of a vehicle into a multi-stage mold having 100 mm width×150 mm depth×1.7 mm-2.1 mm-3.0 mm thickness, may be 4 mm or less.

Another aspect of the present disclosure relates to a rack housing member of a vehicle formed from the composition for a rack housing member of a vehicle.

In an embodiment, the rack housing member of a vehicle may include a torque sensor cover of a rack housing of a vehicle.

A composition for a rack housing member of a vehicle according to the present disclosure may have excellent dimensional stability, an excellent effect of improving warping during injection molding, and excellent rigidity, durability, chemical resistance, injection moldability, productivity and economic efficiency, and may be suitable for use in applications such as a torque sensor cover of a rack housing of a vehicle.

DETAILED DESCRIPTION OF THE ILLUSTRATED EMBODIMENTS

Figure 1:
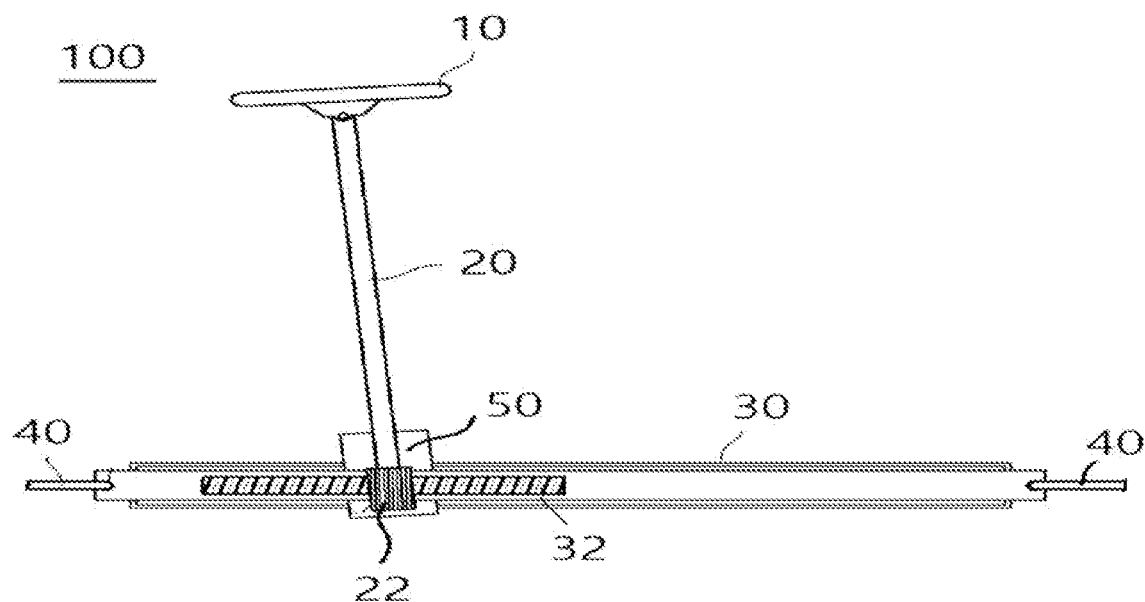
FIG. 1 illustrates a vehicle steering device according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, a composition for a rack housing member of a vehicle having excellent dimensional stability, and a rack housing member of a vehicle prepared using the same will be described below through various exemplary embodiments.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

In the following description, the detailed description of related known technology or configuration will be omitted when it may obscure the subject matter of the present disclosure.

Further, the terms of constituent elements, which will be described hereinafter, are defined in consideration of their functions in the present disclosure and may be changed according to the intention of a user or an operator, or according to the custom. Accordingly, definitions of these terms must be based on the overall description herein.

Composition for Rack Housing Member of Vehicle

One aspect of the present disclosure relates to a composition for a rack housing member of a vehicle. In an embodiment, the composition for a rack housing member of a vehicle comprises: 100 parts by weight of a base resin containing polybutylene terephthalate, an acrylonitrile-styrene-acrylate copolymer, and polyethylene terephthalate; and 40 to 75 parts by weight of an inorganic filler, wherein the inorganic filler includes a glass fiber and a plate-shaped mineral filler.

Hereinafter, the composition for a rack housing member of a vehicle will be described in more detail.

Base Resin

The base resin contains polybutylene terephthalate, an acrylonitrile-styrene-acrylate copolymer, and polyethylene terephthalate. In an embodiment, the base resin may contain 55 to 65 parts by weight of polybutylene terephthalate, 25 to 35 parts by weight of an acrylonitrile-styrene-acrylate copolymer, and 8 to 15 parts by weight of polyethylene terephthalate.

Polybutylene Terephthalate

The polybutylene terephthalate (PBT) refers to a polybutylene terephthalate homopolymer and a polybutylene terephthalate copolymer.

In an embodiment, the polybutylene terephthalate may be prepared by condensation polymerization through direct esterification or transesterification of 1,4-butanediol and terephthalic acid or dimethyl terephthalate.

In an embodiment, the polybutylene terephthalate may have a weight average molecular weight of 5,000 to 300,000 g/mol. The composition of the present disclosure may have excellent mechanical strength under the above conditions.

In an embodiment, the polybutylene terephthalate may have an intrinsic viscosity of 0.5 dl/g to 1.4 dl/g. The composition may have excellent mixability, impact resistance, dimensional stability, and appearance characteristics under the above conditions. In an embodiment, the intrinsic viscosity (IV) of the polybutylene terephthalate resin may be measured at 35° C. using an o-chlorophenol solution (concentration: 0.01 g/ml). For example, the polybutylene terephthalate may have an intrinsic viscosity of 0.5, 0.6, 0.7, 0.8, 0.9, 1.0, 1.1, 1.2, 1.3, or 1.4 dl/g.

In an embodiment, the polybutylene terephthalate may be included in an amount of 55 to 65 parts by weight, based on the total weight of the base resin. When the polybutylene terephthalate is included in the above range, the composition may have excellent fluidity and moldability, and the rack housing member of a vehicle manufactured therefrom may have excellent smoothness, dimensional stability, and mechanical strength. For example, the polybutylene terephthalate may be included in an amount of 55, 56, 57, 58, 59, 60, 61, 62, 63, 64, or 65 parts by weight, based on the total weight of the base resin.

Acrylonitrile-Styrene-Acrylate Copolymer

The acrylonitrile-styrene-acrylate (ASA) copolymer may be amorphous, and may be a graft copolymer having a core-shell structure including a shell layer formed by graft copolymerizing a styrene monomer and an acrylonitrile monomer on a rubbery acrylate polymer core.

In an embodiment, the acrylonitrile-styrene-acrylate copolymer may include 20 to 60 parts by weight of acrylate rubber. When the acrylate rubber is included in the above content, the composition may have excellent heat resistance, weather resistance, and impact resistance.

For example, the acrylonitrile-styrene-acrylate copolymer may include 20 to 60 parts by weight of a rubbery acrylate polymer core, and 40 to 80 parts by weight of a shell layer formed by graft copolymerizing a styrene monomer and an acrylonitrile monomer. The graft copolymerization may be performed using a conventional preparing method. For example, the graft copolymerization may be performed, but is not limited to, using emulsion polymerization, suspension polymerization, solution polymerization, and bulk polymerization.

In an embodiment, the acrylonitrile-styrene-acrylate copolymer may be included in an amount of 25 to 35 parts by weight, based on the total weight of the base resin. When the acrylonitrile-styrene-acrylate copolymer is included in the above content, cooling time during injection may be shortened, and the rack housing member of a vehicle may thus have excellent productivity, dimensional stability, and mechanical strength. For example, the acrylonitrile-styrene-acrylate copolymer may be included in an amount of 25, 26, 27, 28, 29, 30, 31, 32, 33, 34, or 35 parts by weight, based on the total weight of the base resin.

Polyethylene Terephthalate

The polyethylene terephthalate (PET) may be prepared by condensation polymerization through direct esterification or transesterification of terephthalic acid or dimethyl terephthalate as a monomer.

When the polyethylene terephthalate is included, the cooling time during injection of the component may be shortened by easily adjusting a crystallization rate of the base resin, and the rack housing member of a vehicle may thus have excellent productivity, strength, and dimensional stability.

In an embodiment, the polyethylene terephthalate may have a weight average molecular weight of 5,000 to 300,000 g/mol. The composition of the present disclosure may have excellent mechanical strength under the above conditions.

In an embodiment, the polyethylene terephthalate may have an intrinsic viscosity of 0.5 to 1.2 dl/g. The composition may have excellent mixability, impact resistance, dimensional stability, and appearance characteristics under the above conditions. In an embodiment, the intrinsic viscosity (IV) of the polyethylene terephthalate resin may be measured at 35° C. using an o-chlorophenol solution (concentration: 0.01 g/ml). For example, the polyethylene terephthalate may have an intrinsic viscosity of 0.5, 0.6, 0.7, 0.8, 0.9, 1.0, 1.1, or 1.2 dl/g.

In an embodiment, the polyethylene terephthalate may be included in an amount of 8 to 15 parts by weight, based on the total weight of the base resin. When the polyethylene terephthalate is contained in the above content, the cooling time during injection of the component may be shortened, and the rack housing member of a vehicle according to the present disclosure may thus have excellent productivity, strength, and dimensional stability. For example, the polyethylene terephthalate may be included in an amount of 8, 9, 10, 11, 12, 13, 14, or 15 parts by weight, based on the total weight of the base resin.

Meanwhile, in the process of preparing the base resin, in a case where alloying is performed by adding an excessive amount of the acrylonitrile-styrene-acrylate copolymer, which is an amorphous resin, to a crystalline resin, the cooling time may be excessively increased in an injection process of the component, such that process cycle time may be abnormally increased.

In an embodiment, the base resin may include the polyethylene terephthalate, acrylonitrile-styrene-acrylate copolymer, and polybutylene terephthalate at a weight ratio of 1:2 to 5:2 to 7. When the polyethylene terephthalate, acrylonitrile-styrene-acrylate copolymer, and polybutylene terephthalate are contained at the above weight range, mixability and dispersibility of the composition may be excellent, the cooling time during injection may be shortened, and the rack housing member of a vehicle may thus have excellent productivity, strength, and dimensional stability. For example, the above-mentioned compounds may be included at a weight ratio of 1:2 to 4:3 to 7.

Thus, the present disclosure may suppress a high crystallization of polybutylene terephthalate by using polybutylene terephthalate with a high crystallization rate, an acrylonitrile-styrene-acrylate copolymer, and polyethylene terephthalate with a relatively slow crystallization rate in an optimal amount, and may improve dimensional stability while maintaining rigidity by replacing some of the glass fibers that can cause warpage of a product which can be measured by Poisson's ratio with a plate-shaped mineral filler.

Inorganic Filler

The inorganic filler includes a glass fiber and a plate-shaped mineral filler.

In an embodiment, the glass fiber may have a circular or elliptical transversal cross-section. In an embodiment, the glass fiber may have an average diameter of 3 to 15 μm and an average length (chop length) of 0.05 to 5 mm. The composition for a rack housing member of a vehicle may have excellent mixability, moldability, dimensional stability, and mechanical strength under the above conditions.

In an embodiment, the glass fiber may be included in an amount of 35 to 50 parts by weight, based on 100 parts by weight of the base resin. When the glass fiber is included in the above range, the composition may have excellent mixability, dispersibility, and mechanical strength.

For example, the glass fiber may be included in an amount of 35, 36, 37, 38, 39, 40, 41, 42, 43, 44, 45, 46, 47, 48, 49, or 50 parts by weight, based on 100 parts by weight of the base resin.

The plate-shaped mineral filler is included for the purpose of improving dimensional stability and preventing the occurrence of warping (warpage) due to a difference in shrinkage in a vertical direction (i.e., a TD) against a flow direction (i.e., an MD) by the glass fibers being oriented in the flow direction during injection molding of the composition of the present disclosure.

In an embodiment, the plate-shaped mineral filler may include one or more of wollastonite, talc, and mica. For example, the plate-shaped mineral filler may include talc. When the plate-shaped mineral filler includes the above-mentioned components, the composition may have excellent mechanical properties such as rigidity and an excellent effect of improving dimensional stability.

In an embodiment, the plate-shaped mineral filler may have a cross-sectional aspect ratio (long diameter of cross section/short diameter of cross section) of 3 to 50 and a length of 0.01 to 5 mm. The composition may have excellent mixability and moldability, and an excellent effect of improving dimensional stability under the above conditions.

In an embodiment, the plate-shaped mineral filler may be included in an amount of 5 to 20 parts by weight, based on 100 parts by weight of the base resin. When the plate-shaped mineral filler is included in the above content, the mechanical properties of the composition may be prevented from deteriorating, and anisotropy of the glass fiber may be suppressed, resulting in an excellent effect of improving dimensional stability. For example, the plate-shaped mineral filler may be included in an amount of 5, 6, 7, 8, 9, 10, 11, 12, 13, 14, 15, 16, 17, 18, 19, or 20 parts by weight, based on 100 parts by weight of the base resin.

In an embodiment, the inorganic filler may include the plate-shaped mineral filler and the glass fiber at a weight ratio of 1:1.2 to 1:4. When the plate-shaped mineral filler and the glass fiber are included at the above weight ratio, the composition may have excellent rigidity and moldability, and anisotropy of the glass fiber may be suppressed, resulting in an excellent effect of improving dimensional stability. For example, the inorganic filler may include the plate-shaped mineral filler and the glass fiber at a weight ratio of 1:1.8 to 1:3.

In an embodiment, the inorganic filler is included in an amount of 40 to 75 parts by weight, based on 100 parts by weight of the base resin. When the inorganic filler is included in an amount of less than 40 parts by weight, the mechanical properties such as rigidity may deteriorate, and when the inorganic filler is included in an amount exceeding 75 parts by weight, the dimensional stability may deteriorate, and the warpage may be increased. For example, the inorganic filler may be included in an amount of 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 parts by weight, based on 100 parts by weight of the base resin.

Additives

In an embodiment, the composition for a rack housing member of a vehicle may further comprise 0.01 to 30 parts by weight of an additive, based on 100 parts by weight of the base resin. In an embodiment, the additive may include, but is not limited to, one or more of a thermal stabilizer, an antioxidant, a light stabilizer, a release agent, a compatibilizer, a dye, a pigment, a colorant, a plasticizer, an impact modifier, a stabilizer, and a lubricant.

In an embodiment, the composition for a rack housing member of a vehicle may have a tensile strength of 1,100 to 1,600 kgf/cm$^2$ as measured according to ASTM D 638 standard and a flexural strength of 1,800 to 2,500 kgf/cm$^2$ as measured according to ASTM D 790 standard. For example, the composition for a rack housing member of a vehicle may have a tensile strength of 1,250 to 1,400 kgf/cm$^2$ and a flexural strength of 1,950 to 2,200 kgf/cm$^2$.

In an embodiment, the composition for a rack housing member of a vehicle may have, after injection-molding, a machine direction (MD) shrinkage in Equation 1 below which is 0.6% or less, and a transverse direction (TD) shrinkage in Equation 2 below which is 1.2% or less:

$$\text{MD shrinkage (\%)} = ((A_1 - A_0)/A_0) \times 100 \quad \text{[Equation 1]}$$

wherein for a specimen obtained by injection-molding the composition for a rack housing member of a vehicle into a mold having 60 mm MD×60 mm TD×2 mm thickness, $A_0$ is an MD length (mm) measured immediately after injection-molding the specimen, and $A_1$ is an MD length (mm) measured after leaving the specimen at 25° C. for 24 hours.

$$\text{TD shrinkage (\%)} = ((B_1 - B_0)/B_0) \times 100 \quad \text{[Equation 2]}$$

wherein for a specimen obtained by injection-molding the composition for a rack housing member of a vehicle into a mold having 60 mm MD×60 mm TD×2 mm thickness, $B_0$ is a TD length (mm) measured immediately after injection-molding the specimen, and $B_1$ is a TD length (mm) measured after leaving the specimen at 25° C. for 24 hours.

In an embodiment, the TD shrinkage and the MD shrinkage may be values measured by using an electric injection machine (SE75EV-C110) having a screw diameter of 22 mm available from Sumitomo Corporation.

In an embodiment, the TD shrinkage and the MD shrinkage may have a relationship of Equation 3 below:

$$|\text{TD shrinkage (\%)} - \text{MD shrinkage (\%)}| \leq 0.6 \quad \text{[Equation 3]}$$

Under the above conditions, the rack housing member may have a minimized warpage occurrence and excellent dimensional stability. For example, the value of Equation 3 may be 0.5 or less. For example, the value of Equation 3 may be 0.1, 0.2, 0.3, 0.4, 0.5, or 0.6.

In an embodiment, a warpage value measured for a specimen obtained by injection-molding the composition of a rack housing member of a vehicle into a multi-stage mold having 100 mm width×150 mm depth×1.7 mm-2.1 mm-3.0 mm thickness, may be 4 mm or less. For example, the warpage value may be 2.5 mm or less.

For example, the warpage value may be a value measured by using a hydraulic injection machine (LGH100DGC) having a screw diameter of 36 mm available from LS Electric.

In an embodiment, the composition for a rack housing member of a vehicle may be prepared by preparing a pellet-shaped composition by premixing the components having the aforementioned contents using various mixers, and then melting and kneading the premixed components using a Banbury mixer, a roll, a single-screw kneading extruder, a twin-screw kneading extruder, and a kneader, and then injection-molding the pellet-shaped composition. For example, the composition for rack housing member of a vehicle may be prepared by preparing a pellet-shaped composition for a rack housing member of a vehicle by injecting the components of the composition for a rack housing member of a vehicle into a twin-screw extruder, melting and kneading the injected components, and extruding the resulting components at an extrusion temperature of 200 to 300° C., and then injection-molding the pellet-shaped composition.

The composition for a rack housing member of a vehicle according to the present disclosure may have excellent dimensional stability, an excellent effect of improving warping during injection molding, and excellent rigidity, durability, chemical resistance, injection moldability, productivity and economic efficiency, and may be suitable for use in applications such as a torque sensor cover of a rack housing of a vehicle.

Rack housing member of vehicle characterized by being formed from composition for rack housing member of vehicle Another aspect of the present disclosure relates to a rack housing member of a vehicle characterized by being formed from the composition for a rack housing member of a vehicle.

In an exemplary embodiment, the rack housing member of a vehicle may include a torque sensor cover of a rack housing of a vehicle.

Figure 2:
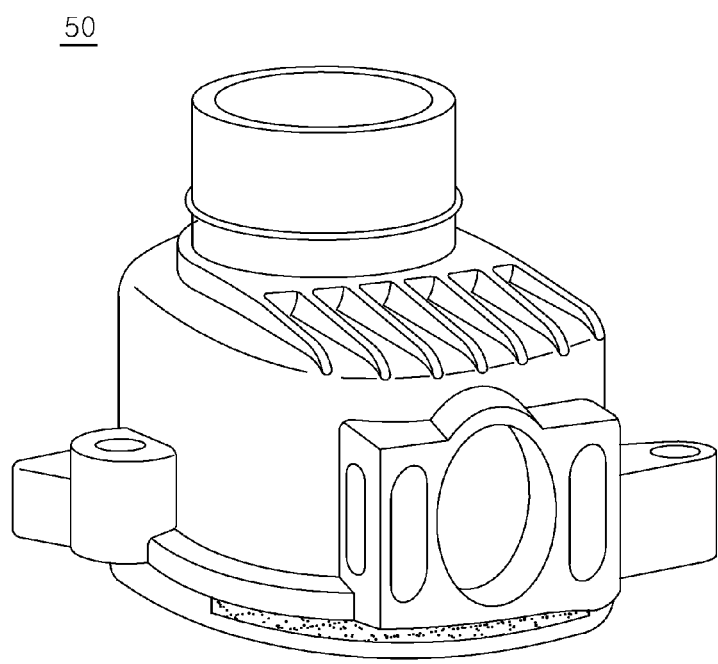
FIG. 2 illustrates a torque sensor cover according to an exemplary embodiment.

FIG. 1 illustrates a vehicle steering device 100 according to an exemplary embodiment, and FIG. 2 illustrates a torque sensor cover 50 according to an exemplary embodiment.

Referring to FIG. 1, the vehicle steering device 100 may include a steering wheel 10, a steering shaft 20, a rack housing 30, and tie rods 40. The steering wheel 10 is disposed in front of the driver's seat. The steering shaft 20 is connected to the steering wheel 10. The rack housing 30 includes a rack drive shaft 32 extending in a transverse direction of a vehicle and engaged with the steering shaft 20. The rack drive shaft 32 converts rotational force, input from the steering shaft 20, into linear motion. The tie rods 40 are disposed on both sides of the rack housing 30 so as to be connected to a knuckle of a wheel. A pinion gear 22 may be provided below the steering shaft 20 so as to be engaged with the rack drive shaft 32.

In an exemplary embodiment, a torque sensor is provided on one side surface of the rack housing 30. The torque sensor is connected to the steering shaft 20 to measure torque applied to the steering shaft 20. The torque sensor may be disposed inside the torque sensor cover 50.

In an exemplary embodiment, the torque sensor cover 50 may be formed from a composition for a rack housing member of a vehicle.

Hereinafter, the configuration and operation of the present disclosure will be described in more detail with reference to preferred examples of the present disclosure. These examples are merely presented as preferred examples of the present disclosure, and cannot be construed as limiting the present disclosure in any way.

EXAMPLES AND COMPARATIVE EXAMPLES

The components used in the following Examples and Comparative Examples are as follows.

(A) Base Resin (A1) A polybutylene terephthalate resin having an intrinsic viscosity of 0.5 to 1.4 dl/g was used. (A2) An acrylonitrile-styrene-acrylate copolymer containing 20 to 60 parts by weight of acrylate rubber was used. (A3) A polyethylene terephthalate resin having an intrinsic viscosity of 0.5 to 1.2 dl/g was used.

(B) Inorganic Filler (B1) The glass fiber having a nominal diameter of 3 to 15 μm and an average length of 0.05 to 5 mm was used. (B2) As the mineral filler, talc was used which has a plate-shaped cross section, a cross-sectional aspect ratio (long diameter of cross section/short diameter of cross section) of 3 to 50, and a length of 0.01 to 5 mm.

Examples 1 to 3 and Comparative Examples 1 to 6

Each of the above components was added in an amount shown in Table 1 below, and the added components were extruded under the conditions of a screw rotation speed of 150 to 250 rpm at a barrel temperature of 200 to 260° C. using a twin-screw extruder, thereby preparing a pellet-shaped composition for a rack housing member of a vehicle. The prepared pellet was dried and injected in an injection machine under the condition of an injection temperature of 250 to 330° C., thereby manufacturing each specimen.

For the Examples 1 to 3 and Comparative Examples 1 to 6, the physical properties of each specimen were evaluated in the following manner and the evaluation results are shown in Table 1 below.

(1) MD shrinkage (%) and TD shrinkage (%): The injection was performed in a mold having 60 mm in a flow direction (i.e., an MD) of resin×60 mm in a vertical direction (i.e., a TD) against the flow direction×2 mm thickness, using an electric injection machine (SE75EV-C110) having a screw diameter of 22 mm available from Sumitomo Corporation. For each of the specimens of the Examples and Comparative Examples obtained by the injection molding as described above, the MD shrinkage and the TD shrinkage were measured according to Equation 1 and Equation 2 below, and a difference in shrinkage was calculated according to Equation 3 below:

$$\text{MD shrinkage (\%)} = ((A_1 - A_0)/A_0) \times 100 \quad \text{[Equation 1]}$$

wherein $A_0$ is an MD length (mm) measured immediately after injection-molding the specimen, and $A_1$ is an MD length (mm) measured after leaving the specimen at 25° C. for 24 hours.

$$\text{TD shrinkage (\%)} = ((B_1 - B_0)/B_0) \times 100 \quad \text{[Equation 2]}$$

wherein $B_0$ is a TD length (mm) measured immediately after injection-molding the specimen, and $B_1$ is a TD length (mm) measured after leaving the specimen at 25° C. for 24 hours.

$$|\text{TD shrinkage (\%)} - \text{MD shrinkage (\%)}| \quad \text{[Equation 3]}$$

(2) Warpage (mm): The warpage was measured for each of the specimens of the Examples and Comparative Examples obtained by injection-molding the composition into a multi-stage mold having 100 mm width×150 mm depth×1.7 mm-2.1 mm-3.0 mm thickness, using a hydraulic injection machine (LGH100DGC) having a screw diameter of 36 mm available from LS Electric. The warpage occurred in a left portion of an injection gate of the injection machine, and was evaluated based on its highest measured value.

(3) Tensile strength (kgf/cm$^2$) and flexural strength (kgf/cm$^2$): The tensile strength was measured in accordance with ASTM D 638 standard and the flexural strength was measured in accordance with ASTM D 790 standard.

(4) Cooling time (sec): The cooling time was measured for the specimens of the Examples and Comparative Examples during the injection molding in (1) above. If the cooling time is short during injection molding, the injected specimen fails to move to a moving side of the mold and is attached to a fixed side thereof. The injection specimen attached to the fixed side is detached only by the operator's intention, and if the cooling time is sufficient, an injection product is withdrawn from the moving side by an eject pin, so that a normal process is possible.

TABLE 1

| Classification | Examples | | | Comparative Examples | | | | | |
|---|---|---|---|---|---|---|---|---|---|
| (parts by weight) | 1 | 2 | 3 | 1 | 2 | 3 | 4 | 5 | 6 |
| (A1) | 60 | 55 | 55 | 100 | 60 | 70 | 60 | 60 | 60 |
| (A2) | 30 | 31 | 35 | — | 40 | 30 | 30 | 30 | 30 |
| (A3) | 10 | 14 | 10 | — | — | — | 10 | 10 | 10 |
| (B1) | 50 | 50 | 45 | 43 | 50 | 50 | 43 | 20 | 45 |
| (B2) | 17 | 17 | 20 | — | 17 | 17 | — | 10 | 35 |
| MD shrinkage (%) | 0.58 | 0.53 | 0.55 | 0.59 | 0.52 | 0.55 | 0.55 | 0.69 | 0.50 |
| TD shrinkage (%) | 1.01 | 1.13 | 1.11 | 1.56 | 0.93 | 1.00 | 1.15 | 1.73 | 0.92 |
| \|TD shrinkage − MD shrinkage\| | 0.43 | 0.60 | 0.56 | 0.47 | 0.41 | 0.45 | 0.60 | 1.04 | 0.42 |
| Warpage (mm) | 2.49 | 3.77 | 4.47 | 8.20 | 1.98 | 2.05 | 5.07 | 4.25 | 2.07 |
| Tensile strength (kgf/cm$^2$) | 1360 | 1330 | 1320 | 1380 | 1150 | 1220 | 1360 | 950 | 1180 |
| Flexural strength (kgf/cm$^2$) | 2060 | 2120 | 2050 | 2300 | 1890 | 1990 | 2060 | 1510 | 1830 |
| Cooling time (sec) | 5.0 | 5.4 | 5.2 | 3.6 | 7.3 | 5.8 | 5.4 | 5.8 | 5.2 |

It could be seen from the result of Table 1 that in the case of Examples 1 to 3 of the present disclosure, the injection cooling time was shortened, resulting in excellent productivity, the MD shrinkage was 0.6% or less, and the TD shrinkage was 1.2% or less, resulting in excellent dimensional stability. On the other hand, it could be seen that in the case of Comparative Examples 1 to 6 outside the scope of the present disclosure, the MD shrinkage, the TD shrinkage, or the warpage was increased compared to Examples 1 to 3, resulting in the reduction in dimensional stability, or the cooling time was increased in the injection process, resulting in the reduction in the productivity.

Simple modifications or changes of the present disclosure can be easily carried out by those of ordinary skill in the art, and all such modifications or changes should be construed as being included in the scope of the present disclosure.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A rack housing member of a vehicle formed from a composition for the rack housing member of the vehicle, comprising:
   100 parts by weight of a base resin comprising polybutylene terephthalate, an acrylonitrile-styrene-acrylate copolymer, and polyethylene terephthalate; and
   40 to 75 parts by weight of an inorganic filler,
   wherein the inorganic filler comprises a glass fiber and a plate-shaped mineral filler.

2. The rack housing member of claim 1, wherein the base resin comprises 55 to 65 parts by weight of polybutylene terephthalate, 25 to 35 parts by weight of an acrylonitrile-styrene-acrylate copolymer, and 8 to 15 parts by weight of polyethylene terephthalate.

3. The rack housing member of claim 1, wherein the polybutylene terephthalate has an intrinsic viscosity of 0.5 to 1.4 dl/g and the polyethylene terephthalate has an intrinsic viscosity of 0.5 to 1.2 dl/g.

4. The rack housing member of claim 1, wherein the acrylonitrile-styrene-acrylate copolymer comprises 20 to 60 parts by weight of acrylate rubber.

5. The rack housing member of claim 1, wherein the glass fiber has an amount of 35 to 50 parts by weight and the plate-shaped mineral filler has an amount of 5 to 20 parts by weight, based on 100 parts by weight of the base resin.

6. The rack housing member of claim 5, wherein the inorganic filler comprises the plate-shaped mineral filler and the glass fiber at a weight ratio of 1:1.2 to 1:4.

7. The rack housing member of claim 1, wherein the glass fiber has a nominal diameter of 3 to 15 μm and an average length of 0.05 to 5 mm.

8. The rack housing member of claim 1, wherein the plate-shaped mineral filler comprises one or more of wollastonite, talc, and mica.

9. The rack housing member of claim 1, wherein the plate-shaped mineral filler has a cross-sectional aspect ratio, defined as a long diameter of cross section/a short diameter of cross section, of 3 to 50 and a length of 0.01 to 5 mm.

10. The rack housing member of claim 1, wherein the composition has a tensile strength of 1,100 to 1,600 kgf/cm$^2$ as measured according to ASTM D 638 standard and a flexural strength of 1,800 to 2,500 kgf/cm$^2$ as measured according to ASTM D 790 standard.

11. The rack housing member of claim 1, wherein the composition has, after injection-molding, a machine direction (MD) shrinkage in Equation 1 below which is 0.6% or less, and a transverse direction (TD) shrinkage in Equation 2 below which is 1.2% or less:

$$\text{MD shrinkage (\%)} = ((A_1 - A_0)/A_0) \times 100 \quad \text{Equation 1}$$

wherein for a specimen obtained by injection-molding the composition for a rack housing member of a vehicle into a mold having a size of 60 mm MD×60 mm TD×2 mm thickness,
$A_0$ is an MD length (mm) measured immediately after injection-molding the specimen, and
$A_1$ is an MD length (mm) measured after leaving the specimen at 25° C. for 24 hours; and $$\text{TD shrinkage (\%)} = ((B_1 - B_0)/B_0) \times 100 \quad \text{Equation 2}$$

wherein for a specimen obtained by injection-molding the composition for a rack housing member of a vehicle into a mold having a size of 60 mm MD×60 mm TD×2 mm thickness, $B_0$ is a TD length (mm) measured immediately after injection-molding the specimen, and $B_1$ is a TD length (mm) measured after leaving the specimen at 25° C. for 24 hours.

12. The rack housing member of claim 11, wherein the TD shrinkage and the MD shrinkage have a relationship of Equation 3 below:

$$|\text{TD shrinkage (\%)} - \text{MD shrinkage (\%)}| \leq 0.6 \quad \text{Equation 3}$$

13. The rack housing member of claim 1, wherein a warpage value measured for a specimen obtained by injection-molding the composition into a multi-stage mold having a size of 100 mm width×150 mm depth×1.7 mm-2.1 mm-3.0 mm thickness is 4 mm or less.

14. The rack housing member of claim 1, wherein the rack housing member of the vehicle comprises a torque sensor cover of the rack housing member of the vehicle.

* * * * *